A. W. WHITCOMB.
FRICTION CLUTCH.
APPLICATION FILED JUNE 2, 1911.
1,049,957.
Patented Jan. 7, 1913.
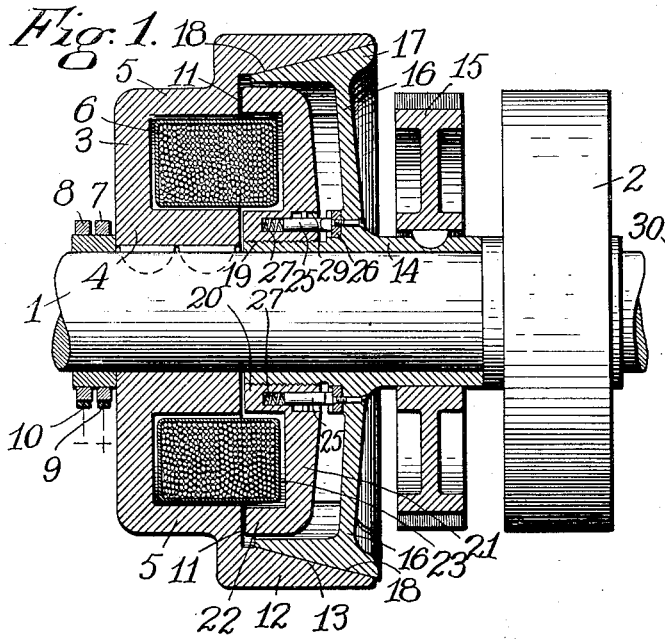
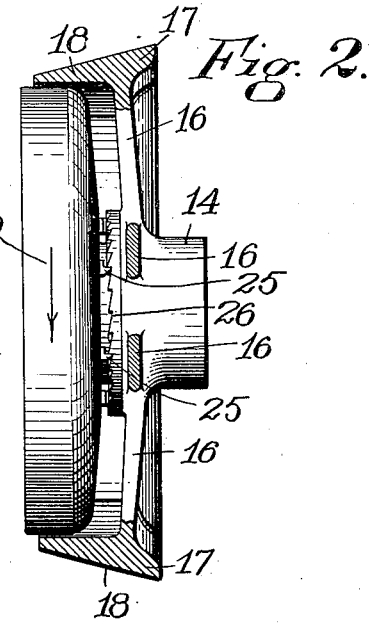
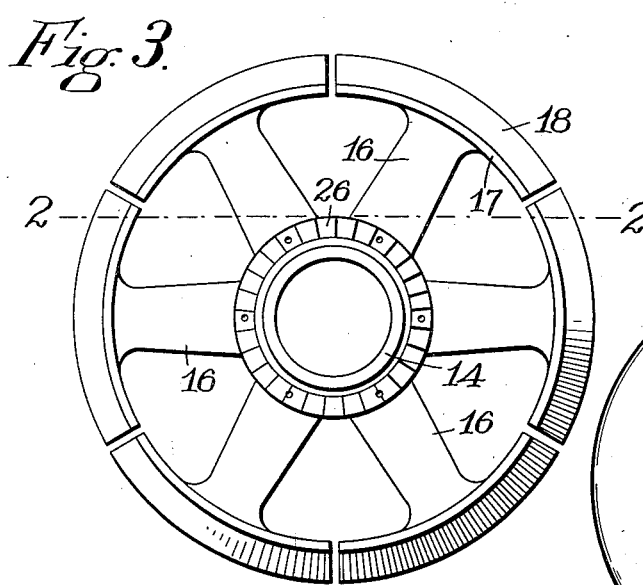
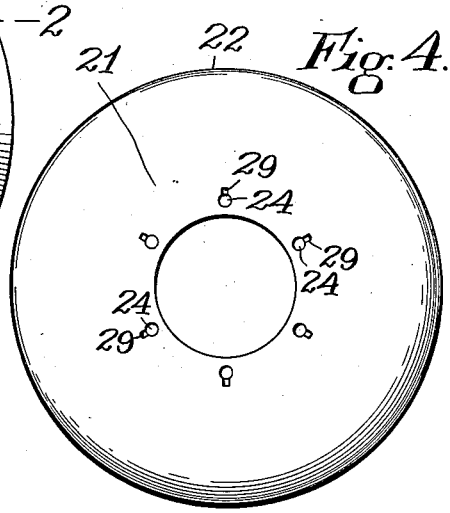
Witnesses
Roy D. Tolman
Penelope Cumberbach
Inventor
Alonzo W. Whitcomb
By Rufus B. Fowler
Attorney

UNITED STATES PATENT OFFICE.

ALONZO W. WHITCOMB, OF WORCESTER, MASSACHUSETTS.

FRICTION-CLUTCH.

1,049,957.  Specification of Letters Patent.  Patented Jan. 7, 1913.

Application filed June 2, 1911. Serial No. 630,833.

*To all whom it may concern:*

Be it known that I, ALONZO W. WHITCOMB, a citizen of the United States, residing at Worcester, in the county of Worcester and Commonwealth of Massachusetts, have invented a new and useful Improvement in Friction-Clutches, of which the following is a specification.

My present invention relates more particularly to that class of friction clutches known as internal expanding clutches, and especially to those clutches in which the clutching members are thrown into engagement by the force of an electromagnet, and it has for its objects to increase the efficiency of the clutch and to secure the proper relation between the clutching members and the magnetic members by which the clutching members are operated. These objects, among others, are secured by the construction and arrangement of parts as hereinafter described and pointed out in the annexed claims.

In the accompanying drawings, Figure 1 represents a side elevation of my improved clutch, shown in vertical central sectional view. Fig. 2 is a detached plan view of a portion of the clutch, with one of the clutching members shown in sectional view on the broken line 2—2, Fig. 3. Fig. 3 is an end view of one of the clutching members. Fig. 4 is an end view of the armature of the electromagnet. Fig. 5 is a perspective view of one of the ratchet pawls.

Similar reference characters refer to similar parts in the different figures.

Referring to Fig. 1, 1 denotes a rotating shaft provided with a belt pulley 2 by which the shaft, in the present instance, is driven. 3 denotes an electromagnet keyed to the shaft 1 and having a hub 4 and a peripheral flange 5. Between the hub 4 and the flange 5 is an annular space which contains a wire coil 6 having its terminals connected in the usual manner with the rings 7 and 8, provided with brushes 9 and 10 forming the two poles of an electric circuit. The peripheral flange 5 of the electromagnet is provided with a face 11 in a plane preferably at right angles with the axis of rotation of the electromagnet. Integral with the peripheral flange 5 is a friction ring 12 having an interior beveled surface 13, said ring 12 forming one of the clutching members. Turning loosely upon the shaft 1 is a sleeve 14, to which is keyed, in the present instance, a gear wheel 15 through which the rotary motion of the sleeve 14 may be imparted to the work to be driven. Extending outwardly from the sleeve 14 are a series of spokes 16, upon the ends of which are mounted the separated sections 17 curved concentrically with the axis of the shaft 1 and having an outer beveled surface 18 fitting the inner beveled surface 13 of the friction ring 12. Each of the spokes 16 is slightly dished toward the lower side of the beveled surface 18, as shown in Figs. 1 and 2. The sleeve 14 is provided with a screw thread 19 to receive the screw threaded hub 20 of an armature 21, provided with a peripheral flange 22 and inclosing an annular space 23 to receive that portion of the wire coil 6 which projects from the electromagnet. The armature 21 is provided with a series of concentric equidistant recesses 24 to receive the pins or pawls 25, having their outer ends beveled to engage an annular ratchet 26 attached to the spokes 16. Inserted in the recesses 24 and behind each of the pawls 25 is a spiral spring 27, which crowds the beveled ends of the pawls into engagement with the annular ratchet 26. The pawls 25 are held from turning in the recesses 24 by means of a stud 28, which slides in a key-way 29. The spokes 16 are elastic and, as soon as the beveled surface 18 of the interior clutching member is brought into contact with the beveled surface 13 of the exterior clutching member, any force exerted upon the sleeve 14 to draw it toward the electromagnet will tend to straighten the dished spokes 16, or move them from their dished position, as shown in Figs. 1 and 2, toward a radial position, which will expand the sections 17 and crowd their beveled surfaces 18 more firmly against the exterior friction ring 12.

In the operation of the clutch shown in the accompanying drawings the electromagnet is driven through the belt pulley 2, carrying with it the friction ring 12 forming the outer clutching member. The sleeve 14 with the spokes 16 and curved separated sections 17 forming the inner clutching member are held stationary by the resistance of the load upon the gear wheel 15. When the electromagnet is energized, the armature is drawn into contact with the electromagnet and caused to rotate in the direction of the arrow 30, Fig. 2. The rotation of the armature in the direction of the arrow 30 upon the screw threaded sleeve 14 draws the inner clutching member into contact with the outer clutching member. As soon as the frictional surfaces 13 and 18 are brought into contact, the strain applied by the electromagnet upon the sleeve 14 will tend to draw the sleeve toward the electromagnet and straighten the dished spokes 16, thereby expanding the friction surface 18 of the inner clutching member against the friction surface 13 of the outer clutching member. The application of the force of the magnet upon the sleeve 14 tends to draw the dished spokes 16 toward a plane more nearly at right angles with their axes of rotation. The attractive force of the electromagnet will continue to act upon the elastic or yielding spokes 16 to impart a radial thrust upon the separated sections 17 until the frictional contact of the surfaces 13 and 18 causes the inner clutching member to rotate synchronously with the electromagnet and shaft 1. The independent rotation of the armature 21 upon the screw threaded sleeve 14, therefore, draws the clutching members together in a line parallel with their axes of rotation until the inner clutching member contacts with the outer clutching member, when the pressure is increased between the outer and inner clutching members by the springing of the elastic spokes 16 toward a plane more nearly at right angles with their axes of rotation, or until a sufficient pressure exists between the clutching members to cause the rotation of one clutching member to be imparted to the other.

Whenever the electromagnet is deënergized, both the armature 21 and the inner clutching member are released and brought to a state of rest by the resistance of the load upon the gear wheel 15. The elasticity of the spokes 16 will then return them to their normal dished position, causing a slight sliding movement to take place in the sleeve 14 sufficient to draw the armature slightly away from the electromagnet. When the electromagnet is again energized, its action upon the armature 21 will instantly draw the inner clutching member into operative position to be rotated by the outer clutching member. No further rotative movement of the armature upon the screw threaded sleeve 14 will then take place until the frictional surfaces 13 and 18 become worn. Any lost motion occasioned by the wearing away of the frictional surfaces 13 and 18 will be at once taken up by the rotation of the armature 21 upon the screw threaded sleeve 14. The screw threaded connection between the armature 21 and the sleeve 14 automatically adjusts the position of the inner clutching member to take up any wear that may occur. During the independent rotation of the armature 21 on the screw threaded sleeve 14, the pawls 25, carried by the armature, slide over the teeth of the ratchet 26. The ratchet 26, however, prevents any reverse movement of the armature upon the screw threaded sleeve 14 which would tend to unscrew the armature from the sleeve.

My improved friction clutch as herein described comprises two clutching members; means for drawing the clutching members together, comprising two magnetic members; means for increasing the pressure between the opposing surfaces of the clutching members when they have been brought into contact; and automatic means for adjusting the clutching members to provide against lost motion by the wearing of their frictional surfaces. I am aware, however, that the results described may be accomplished by magnetically operated friction clutches embodying the different mentioned elements, but different in details of construction from that I have herein described and shown in the accompanying drawings as what I deem a preferable embodiment of my present invention.

I claim,

1. A clutch, comprising an electromagnet, an armature, two clutching members, with one of said clutching members having a fixed relation to said electromagnet, means for connecting the other clutching member with said armature, and means for automatically adjusting the relation of said armature to its connected clutching member.

2. A clutch, comprising two magnetically attracted members and two clutching members, with one of said magnetic members having a fixed relation to one of said clutching members, and with the other magnetic member having an adjustable connection with the other of said clutching members.

3. A clutch, comprising two members, one of which consists of an electromagnet, whereby said members are capable of being mutually attracted when said electromagnet has been energized, two clutching members, with one of said clutching members held in a fixed relation to one of said magnetic members, and with the other of said clutching members adjustably connected with the other of said magnetic members, and an electric circuit for energizing one of said magnetic members.

4. In a friction clutch, an annular clutching member having an interior beveled friction surface, a second clutching member having a corresponding exterior beveled friction surface, two magnetic members consisting of an electromagnet and its armature, with one of said magnetic members held in a fixed relation with one of said clutching members and with the other of said magnetic members adjustably connected with the other of said clutching members.

5. A clutch, comprising two clutching members capable of frictional engagement, an electromagnet held in fixed relation to one of said clutching members, and an armature for said electromagnet having a screw threaded connection with the other of said clutching members.

6. A clutch, comprising outer and inner rotative clutching members provided with beveled frictional engaging surfaces, an electromagnet held in fixed relation to one of said clutching members, and an armature operatively connected with the hub of the other clutching member by a screw threaded connection and capable of an independent rotative movement.

7. In a friction clutch, an outer clutching member having an interior beveled friction surface, an inner clutching member, comprising concentric sections having exterior beveled friction surfaces supported on elastic arms or spokes normally lying in a plane at an oblique angle to their axes of rotation, means for moving said friction surfaces into contact, and means for applying a strain to said elastic arms or spokes to press them toward a plane at right angles to their axes of rotation.

8. In a friction clutch, outer and inner clutching members having opposed beveled frictional surfaces, an electromagnet carried by one of said clutching members, and an armature carried by the other of said clutching members and having a screw threaded connection therewith.

9. In a clutch, a rotatable electromagnet, an armature therefor, an outer and an inner clutching members having opposing beveled surfaces, said outer clutching member being held in fixed relation to said electromagnet, and said armature having a screw threaded connection with said inner clutching member.

10. In a clutch, outer and inner clutching members having opposing beveled frictional surfaces, an electromagnet and an armature therefor forming two magnetic members, said armature having a screw threaded connection with said inner clutching member, whereby the relative positions of said clutching members and said magnetic members may be adjusted.

11. In a clutch, a rotatable electromagnet, an armature therefor, forming two magnetic members, outer and inner clutching members having opposing beveled surfaces, said outer clutching member being held in fixed relation to said electromagnet and said inner clutching member having a screw threaded connection with said armature, and a pawl and ratchet mechanism between said inner clutching member and said armature to limit the rotative movement of said armature in one direction relatively to said inner clutching member.

12. In a clutch, outer and inner clutching members, an electromagnet held in fixed relation to said outer clutching member, an armature having an adjustable connection with said inner clutching member by means of the rotation of the armature independently of the rotation of said inner clutching member.

Dated this first day of June 1911.

ALONZO W. WHITCOMB.

Witnesses:
 PENELOPE COMBERBACH,
 NELLIE WHALEN.